United States Patent [19]
Cho

[11] Patent Number: 6,081,902
[45] Date of Patent: Jun. 27, 2000

[54] CONTROL SYSTEM AND METHODS FOR POWER SHUTDOWN OF A COMPUTER SYSTEM

[75] Inventor: Jong-Il Cho, Suwon, Rep. of Korea

[73] Assignee: SamSung Electronics Co., Ltd., Suwon, Rep. of Korea

[21] Appl. No.: 09/036,778

[22] Filed: Mar. 9, 1998

[30] Foreign Application Priority Data

Mar. 7, 1997 [KR] Rep. of Korea .................. 97-7689

[51] Int. Cl.[7] .................................................. G06F 1/26
[52] U.S. Cl. ........................................ 713/330; 713/340
[58] Field of Search ................................. 713/330–340

[56] References Cited

U.S. PATENT DOCUMENTS

| | | |
|---|---|---|
| 4,204,249 | 5/1980 | Dye et al. . |
| 4,747,041 | 5/1988 | Engel et al. . |
| 5,008,846 | 4/1991 | Inoue . |
| 5,389,952 | 2/1995 | Kikinis . |
| 5,414,863 | 5/1995 | Lee et al. . |
| 5,463,408 | 10/1995 | Mio . |
| 5,481,732 | 1/1996 | Shahbazi . |
| 5,511,201 | 4/1996 | Kamimaki et al. . |
| 5,535,400 | 7/1996 | Belmont . |
| 5,563,455 | 10/1996 | Cheng ........................................ 307/41 |
| 5,703,629 | 12/1997 | Mermelstein et al. . |
| 5,752,050 | 5/1998 | Hernandez et al. .................... 713/330 |
| 5,777,611 | 7/1998 | Song ....................................... 345/212 |
| 5,790,096 | 8/1998 | Hill, Jr. ................................... 345/150 |
| 5,805,923 | 9/1998 | Shay ........................................... 710/8 |

*Primary Examiner*—Ayaz R. Sheikh
*Assistant Examiner*—David A. Wiley
*Attorney, Agent, or Firm*—Robert E. Bushnell, Esq.

[57] ABSTRACT

A control apparatus for turning off a computer system is provided which protects a display from damage. Also, methods for turning off a computer system are provided which protect a display from damage. The control apparatus and methods for turning off power supplied to a computer system having a display provide that power supplied to the display is turned off first and power supplied to the entire computer system is turned off last. A first control unit outputs a first signal to initiate cut off of power supplied to the display if a power switch is turned off and also outputs a second signal to cut off power supplied to the entire computer system after power to the display has been cut off. A second control unit receives the first signal and outputs a third signal to cut off power supplied to the display in response to the first signal.

20 Claims, 6 Drawing Sheets

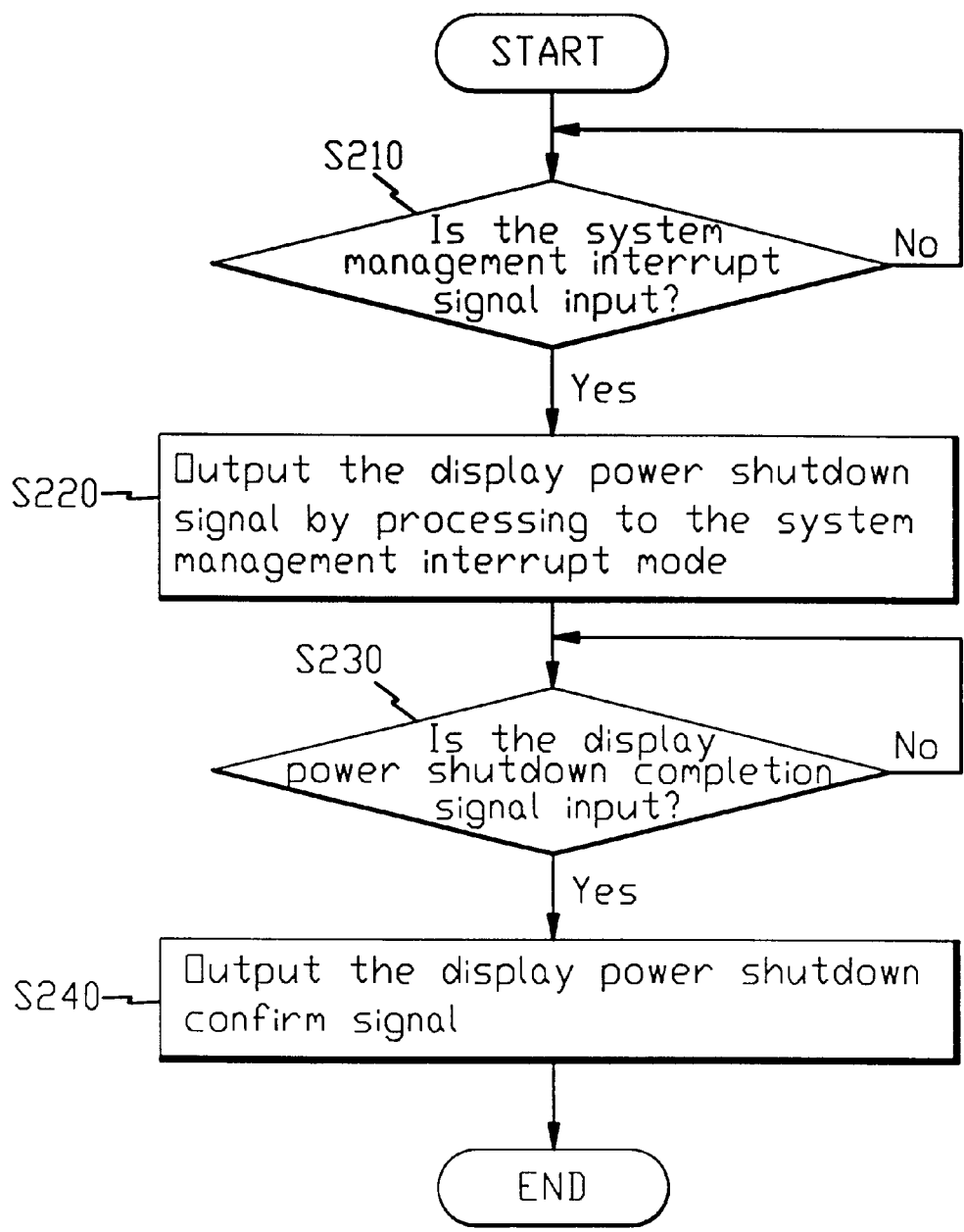

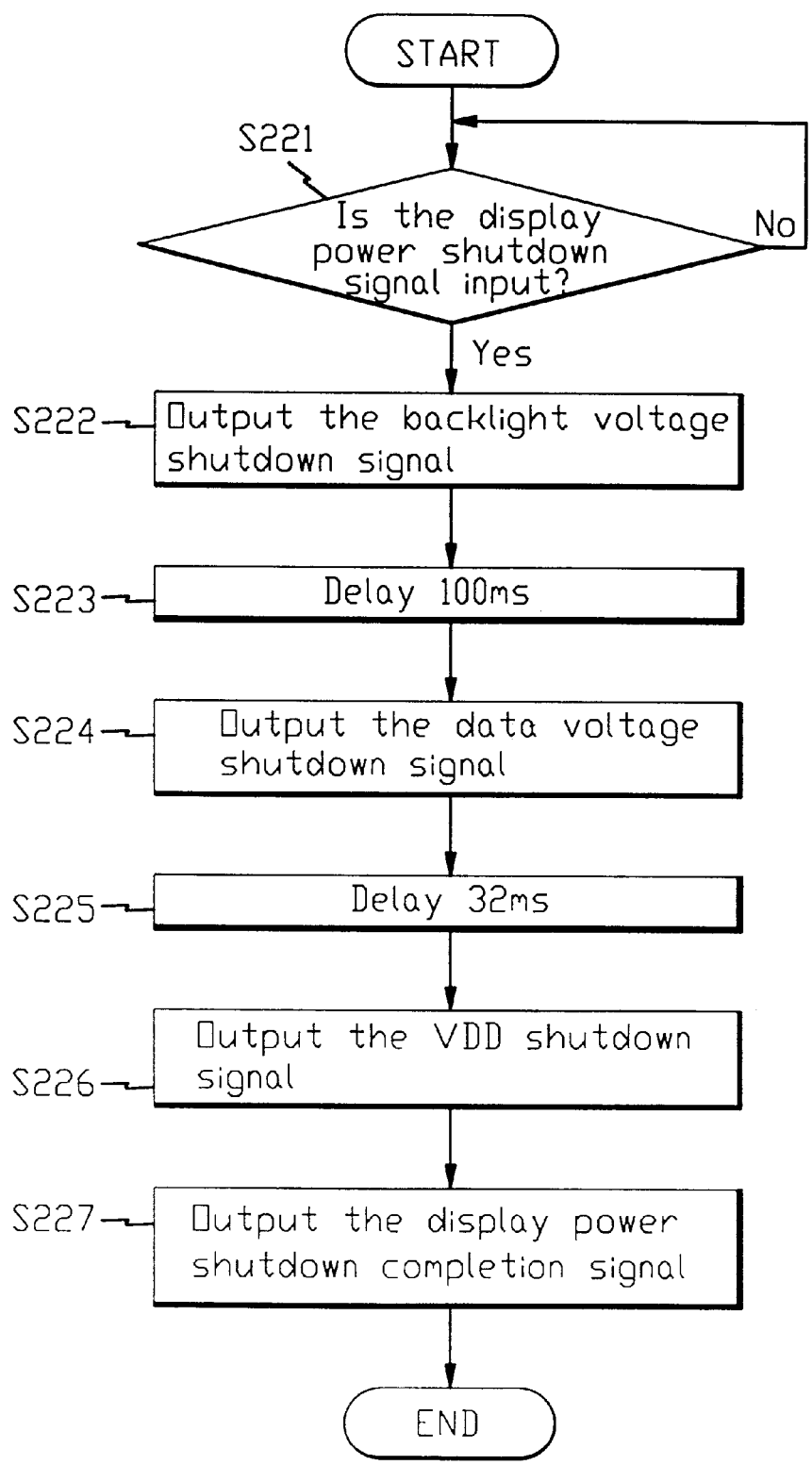

CONTROL SYSTEM AND METHODS FOR POWER SHUTDOWN OF A COMPUTER SYSTEM

CLAIM OF PRIORITY

This application makes reference to, incorporates the same herein, and claims all benefits accruing under 35 U.S.C. §119 from an application for A CONTROL SYSTEM AND METHODS FOR POWER SHUTDOWN OF A COMPUTER SYSTEM earlier filed in the Korean Industrial Property Office on the 7th day of Mar. 1997, and there duly assigned Ser. No. 97-7689, a copy of which is annexed hereto.

BACKGROUND OF THE INVENTION

1. Technical Field

The present invention relates to a control apparatus for turning off a computer system, and more particularly to a control apparatus for turning off power supplied to a computer system having a display, where power supplied to the display is turned off first and power supplied to the entire computer system is turned off last. The present invention also relates to methods for turning off power supplied to a computer system having a display, where power supplied to the display is turned off first and power supplied to the entire computer system is turned off last.

2. Related Art

Utilizing a conventional technique to turn off a computer system having a display screen, the computer system is turned off when a user presses a power switch and cuts off power directly to a switching mode power supply. As a result, power is cut off abruptly to the entire computer system, including the display screen. In addition, conventionally power is supplied simultaneously to all units in a single apparatus and power is disconnected simultaneously from all units in a single apparatus.

Using the conventional technique described above to turn off a computer system, the display screen can be damaged by an electrical surge when power to the entire system and to the display is simultaneously and abruptly turned off. Also, the display screen experiences flicker and afterimage when power to the entire system and the display are turned off simultaneously. Malfunctions in the display may occur due to rush current and abnormal voltages.

There do exist power supply control systems which control various aspects of power supplies. For example, some power supply control systems are disclosed in U.S. Pat. No. 4,747,041 for Automatic Power Control System Which Automatically Activates and Deactivates Power to Selected Peripheral Devices Based Upon System Requirement issued to Engel et al., U.S. Pat. No. 4,204,249 for Data Processing System Power Control issued to Dye et al., U.S. Pat. No. 5,414,863 for Power Control Staggering Circuit for Powering Different Components at Different Delay Timings issued to Lee et al., and U.S. Pat. No. 5,535,400 for SCSI Disk Drive Power Down Apparatus issued to Belmont.

Some examples of power supply control systems partially controlling power supplied to display screens are disclosed in U.S. Pat. No. 5,389,952 for Low-Power-Consumption Monitor Standby System issued to Kikinis, U.S. Pat. No. 5,008,846 for Power and Signal Supply Control Device issued to Inoue, U.S. Pat. No. 5,511,201 for Data Processing Apparatus, Power Supply Controller and Display Unit issued to Kamimaki et al., U.S. Pat. No. 5,481,732 for CRT Monitor Power Control Unit issued to Shahbazi, U.S. Pat. No. 5,703,629 for Computer System Including Protected Graphics Display Control Signal Sequencing issued to Mermelstein et al., and U.S. Pat. No. 5,463,408 for Liquid-Crystal Display issued to Mio.

Currently there are some power supply control systems which claim to offer protection to displays under certain conditions. However, I have discovered that it would be desirable to develop an enhanced power supply control system to control power supplied to a display in order to better protect against damage to the display.

SUMMARY OF THE INVENTION

Accordingly, it is therefore an object of the present invention to provide a control apparatus for turning off a computer system.

It is another object of the present invention to provide a control apparatus and methods for turning off power supplied to a computer system having a display, where power supplied to the display is turned off first and power supplied to the entire computer system is turned off last.

It is yet another object of the present invention to provide a control apparatus and methods for turning off power in which power to a display screen is first cut off and then power to other parts are cut off, when the power of the computer system is turned off.

It is another object of the present invention to provide a computer system which can sequentially cut off power according to controls of the control apparatus and methods thereof.

These and other objects of the present invention can be achieved with a control method for power shutdown of a computer system by judging whether a system power switch is turned off, cutting off power supplied to a display if the system power switch is turned off, and cutting off power supplied to the entire system after power supplied to the display is cut off.

Also, the above objects and other objects of the present invention can be achieved with a control apparatus for power shutdown of a computer system, using a first control unit outputting a system management interrupt signal to initiate cut off of power supplied to a display if a system power switch is turned off, and outputting a system power off signal in order to cut off power supplied to the entire system after power to the display has been cut off, together with a second control unit outputting a display power shutdown signal in order to interrupt transmission of electrical power supplied to the display upon receiving the system management interrupt signal.

In addition, the above objects and other objects of the present invention can be achieved by a computer system comprising a system power switch for turning on and off system power, a display displaying characters and images according to input data and control signals, and a control unit first interrupting transmission of electrical power to the display when the power switch is turned off and then interrupting transmission of electrical power to the remainder of the entire system.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 is a flowchart illustrating steps of a computer shutdown controlled by a central processing unit, according to the principles of the present invention; and FIG. 6 is a flowchart illustrating steps of a computer shutdown controlled by a video graphics array controller, according to the principles of the present invention.

DETAILED DESCRIPTION OF THE PREFERRED EMBODIMENT

Figure 1:
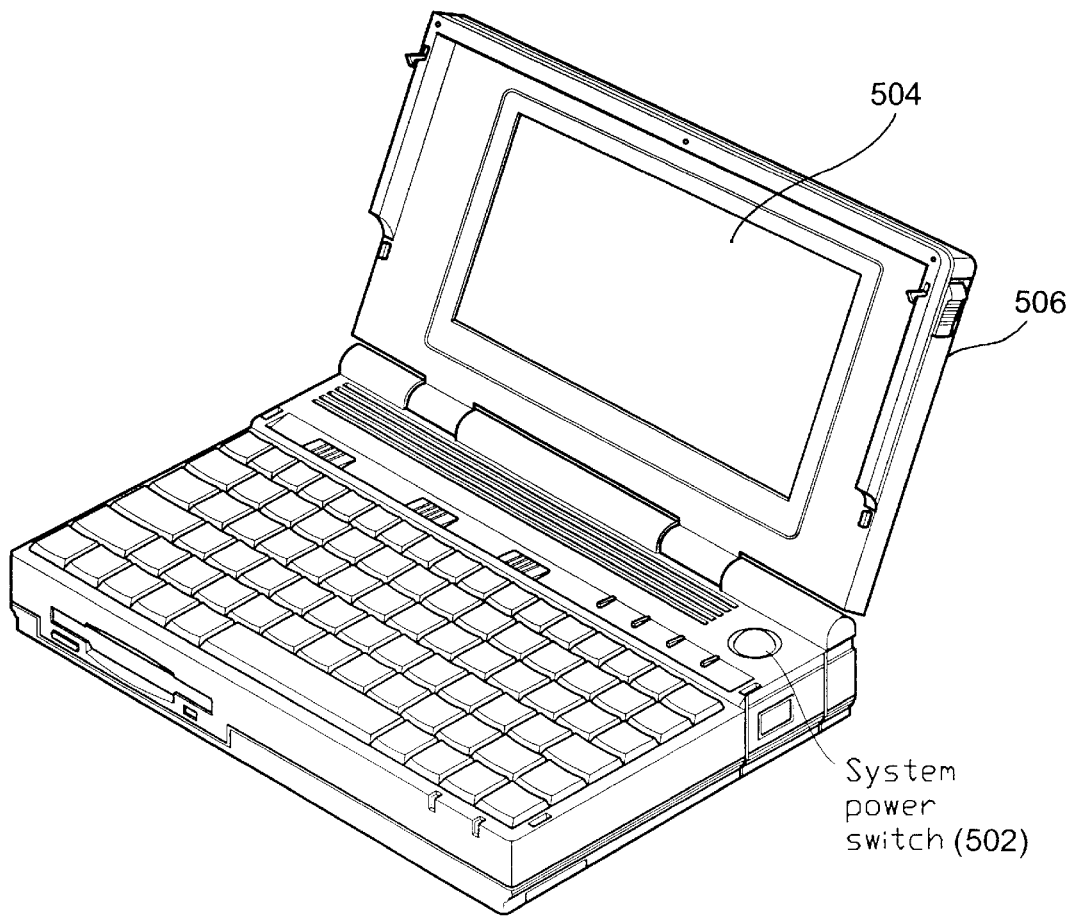
FIG. 1 is a perspective view illustrating an exemplary notebook computer.

Refer now to FIG. 1, which is a perspective view illustrating an exemplary notebook computer. The exemplary notebook computer 500 includes a system power switch 502, a display unit 506, and a display screen 504 encased by the display unit 506. After the computer 500 has been turned on, the conventional technique used to turn it off is initiated when the system power switch 502 is pressed by a user. When the system power switch 502 is pressed, power supplied to a switching mode power supply within the computer 500 is cut off. As a result, power to the display screen 504 and to the entire computer system 500 is cut off abruptly.

Using the conventional technique described above to turn off a computer system, the display unit 506 and the display screen 504 can be damaged by an electrical surge when power to the entire computer system 500 is turned off. The electrical surge and the resulting damage can occur because when power to the entire computer system 500 is turned off, power is abruptly turned off simultaneously to the display unit 506, the display screen 504, and all other components of the computer 500.

Also, the display screen 504 experiences flicker and afterimage when power to the entire computer system 500 and to the display screen 504 and display unit 506 are turned off simultaneously. Malfunctions in the display screen 504 and display unit 506 may occur due to rush current and abnormal voltages.

Figure 2A:
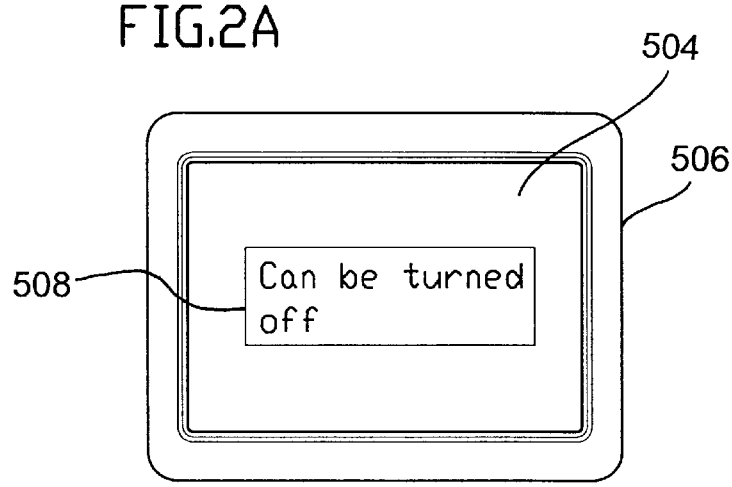
FIG. 2A illustrates the state of a computer display screen before power is turned off in an exemplary computer.
Figure 2B:
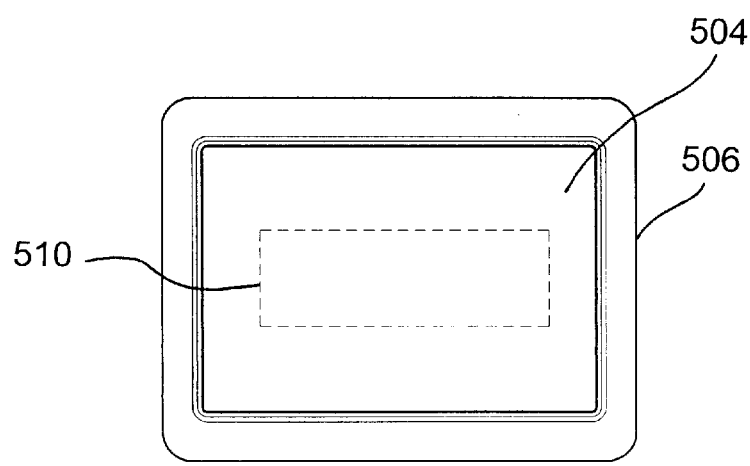
FIG. 2B illustrates the state of a computer display screen immediately after power is turned off in an exemplary computer.
Figure 2C:
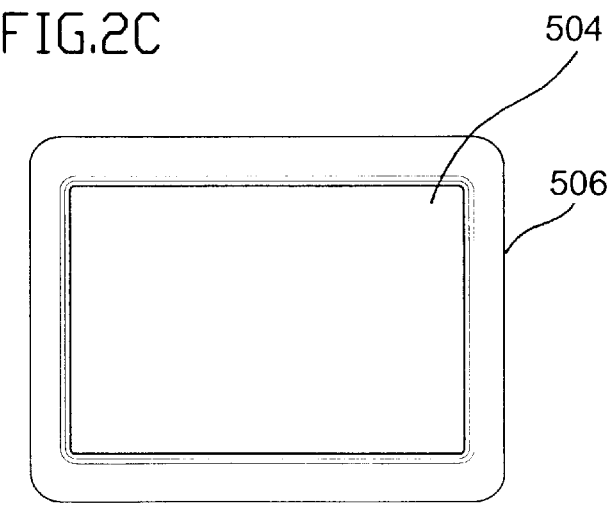
FIG. 2C illustrates the state of a computer display screen when a period of time has elapsed after power is turned off in an exemplary computer.

With continued reference to FIG. 1 and additional reference to FIGS. 2A, 2B, and 2C, damage to display screens shall be discussed further. Refer now to FIG. 2A, which illustrates the state of a computer display screen before power is turned off in an exemplary computer. In FIG. 2A, a message 508 is displayed on a display screen 504 which indicates that power can be turned off. The display screen 504 is contained in a display unit 506.

Refer now to FIG. 2B, which illustrates the state of a computer display screen immediately after power is turned off in an exemplary computer. In FIG. 2B, a display unit 506 of an exemplary computer 500 is shown. The display screen 504 of the display unit 506 is experiencing flicker and afterimage 510. The flicker and afterimage 510 can occur when the computer 500 is turned off.

Refer now to FIG. 2C, which illustrates the state of a computer display screen when a period of time has elapsed after power is turned off in an exemplary computer. In FIG. 2C, a display unit 506 of an exemplary computer 500 is shown. The display screen 504 is blank when a period of time has elapsed after power is turned off in the computer 500.

Figure 3:
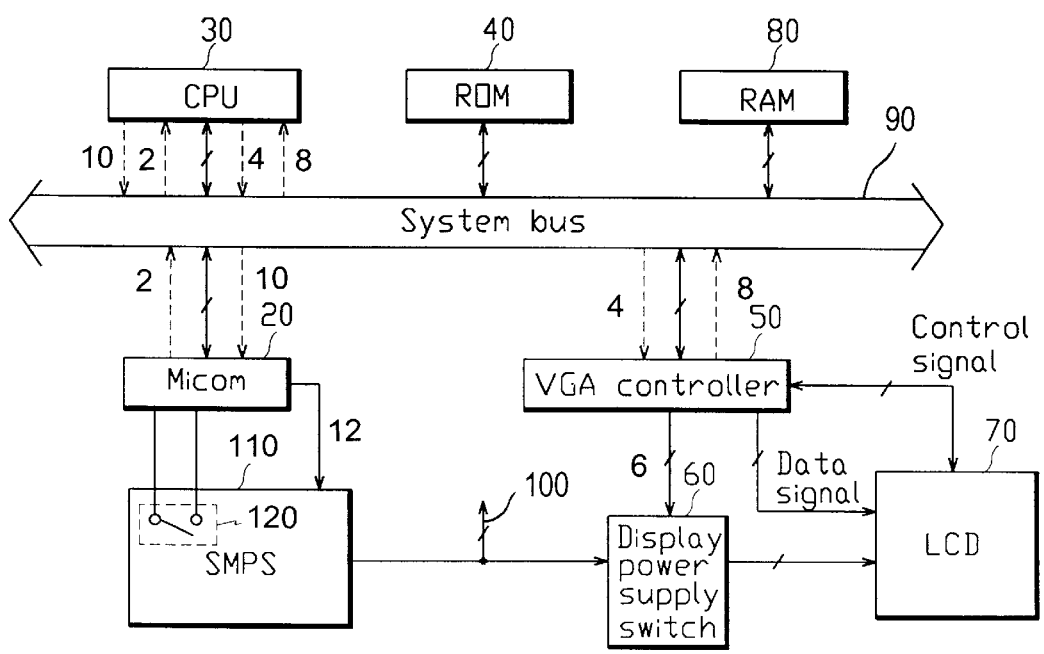
FIG. 3 is a block diagram illustrating a control apparatus for power shutdown of a computer according to the principles of the present invention.

Refer now to FIG. 3, which is a block diagram illustrating a control apparatus for power shutdown of a computer according to the principles of the present invention. Signals are labeled 2–12. The signals are labeled in ascending order to correspond to the flow sequence of the signals.

In FIG. 3, a control system is depicted which can be used to shut off power to a computer connected with a liquid crystal display 70 (LCD). Generally, a micom 20 (microcomputer) first sends out a signal to cut off power to a liquid crystal display 70 and then later sends out a signal to cut off power to the entire system.

A switching mode power supply 110 having a system power switch 120 is connected to the micom 20 (microcomputer). The micom 20 checks the state of the system power switch 120, outputs a system management interrupt signal 2 to initiate a power shutdown process if the system power switch 120 is off, and outputs a system power off signal 12 to the switching mode power supply 110 to cut off the power supplied to the entire computer system. A central processing unit 30 (CPU) receives the system management interrupt signal 2, outputs a display power shutdown signal 4 by accessing a system management interrupt routine stored in a read-only memory 40 (ROM), and outputs a display power shutdown confirm signal 10 to the micom 20. A video graphics array (VGA) controller 50 receives the display power shutdown signal 4 from the central processing unit 30, outputs a power control signal 6 to the liquid crystal display 70, and outputs a display power shutdown completion signal 8 to the central processing unit 30 once power shutdown to the liquid crystal display 70 is completed. A display power supply switch 60 is used for transferring power from the switching mode power supply 110 to the liquid crystal display 70. The display power supply switch 60 also cuts off power, in sequential order, for a backlight voltage, a data voltage, and a source voltage $V_{DD}$ of the liquid crystal display 70 according to the power control signal 6 of the video graphics array controller 50. A system bus 90 is connected with the micom 20, the central processing unit 30, the read-only memory 40, the video graphics array controller 50, and a random access memory 80 (RAM). The line 100 is connected to other components in the computer which require power to be supplied.

Figure 4:
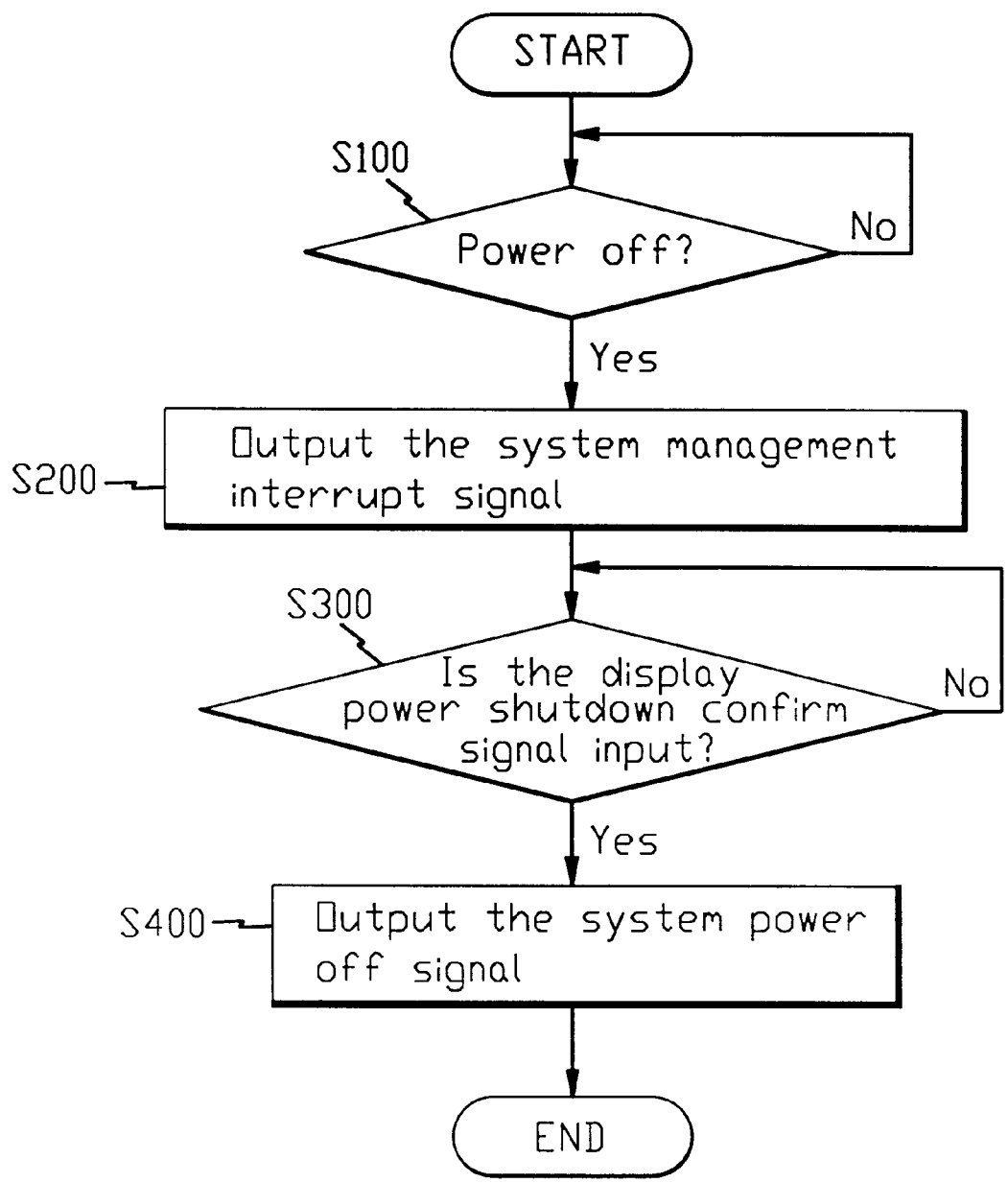
FIG. 4 is a flowchart illustrating steps of a computer shutdown controlled by a micom, according to the principles of the present invention.

With further reference to FIG. 3, and additional reference to FIGS. 4–6, the control system of FIG. 3 shall be described in more detail. FIG. 4, which is a flowchart illustrating steps of a computer shutdown controlled by a micom (microcomputer), according to the principles of the present invention, shall now be described. At step S100, the micom 20 determines whether the system power switch 120 of the switching mode power supply 110 is turned off. At step S200, if the system power switch 120 is off, the micom 20 outputs the system management interrupt signal 2 to the central processing unit 30 to initiate the cut off of power supplied to the liquid crystal display 70.

FIG. 5, which is a flowchart illustrating steps of a computer shutdown controlled by a central processing unit, according to the principles of the present invention, shall now be described. At step S210, the central processing unit 30 determines whether the system management interrupt signal 2 has been received from the micom 20. At step S220, if the system management interrupt signal 2 has been received from the micom 20, the central processing unit 30 outputs the display power shutdown signal 4 to the video graphics array controller 50 by accessing a system management interrupt routine stored in the read-only memory 40.

FIG. 6, which is a flowchart illustrating steps of a computer shutdown controlled by a video graphics array controller, according to the principles of the present invention, shall now be described. The general function of the video graphics array controller 50 is to control and output data to the liquid crystal display 70. At step S221, the video graphics array controller 50 determines whether the display power shutdown signal 4 is received from the central processing unit 30. If the display power shutdown signal 4 has been received from the central processing unit 30, then the video graphics array controller 50 outputs the power control signal 6 to the display power supply switch 60, as shown in steps S222–S226.

In general, the power control signal 6 comprises three signals and incorporates two delays, as depicted in FIG. 6 in steps S222–S226. The power control signal 6 includes a backlight voltage shutdown signal, a data voltage shutdown signal, and a source voltage $V_{DD}$ shutdown signal, which are outputted from the video graphics array controller 50 to the display power supply switch 60 sequentially. The display power supply switch 60 accordingly cuts off power sequentially to a backlight voltage, a data voltage, and a source voltage $V_{DD}$ of the liquid crystal display 70. There is one delay of about 100 milliseconds and one delay of about 32 milliseconds.

More specifically, with further reference to FIG. 6, the video graphics array controller 50 outputs the backlight voltage shutdown signal to the display power supply switch 60 at step S222 and thereby causes the backlight voltage to be cut off from the liquid crystal display 70. Next there is a delay of about 100 milliseconds, at step S223. At step S224, the video graphics array controller 50 outputs the data voltage shutdown signal to the display power supply switch 60 and thereby causes the data voltage to be cut off from the liquid crystal display 70. At step S225, there is a delay of about 32 milliseconds. At step S226, the video graphics array controller 50 outputs the source voltage $V_{DD}$ shutdown signal to the display power supply switch 60 and thereby causes the source voltage $V_{DD}$ to be cut off from the liquid crystal display 70. At step S227, the power shutdown process for the liquid crystal display 70 has been completed and the video graphics array controller 50 outputs the display power shutdown completion signal 8 to the central processing unit 30.

In FIG. 5 at step S230, the central processing unit 30 determines whether the display power shutdown completion signal 8 has been received from the video graphics array controller 50. At step S240, if the display power shutdown completion signal 8 has been received from the video graphics array controller 50, the central processing unit 30 outputs the display power shutdown confirm signal 10 to the micom 20.

In FIG. 4 at step S300, the micom 20 determines whether the display power shutdown confirm signal 10 has been received from the central processing unit 30. At step S400, if the display power shutdown confirm signal 10 has been received from the central processing unit 30, then the micom 20 outputs the system power off signal 12 to the switching mode power supply 110. Thus, power supplied to the entire computer system by the switching mode power supply 110 is cut off.

Therefore, according to an embodiment of the present invention, the liquid crystal display 70 can be turned off without the flicker and afterimage 510 illustrated in FIG. 2B, thereby eliminating a risk of damaging the liquid crystal display 70. In other words, the liquid crystal display 70 directly changes from the state depicted in FIG. 2A to that in FIG. 2C. As a result, the present invention allows display stability and extension of lifetime of a display as well as improving display quality.

An embodiment of the present invention was illustrated above by using the following two components together: the central processing unit 30 and the micom 20. However, it would be possible to shutdown a computer according to the principles of the present invention using the central processing unit 30 only, without the use of the micom 20, without departing from the true scope of the present invention. Also, it would be possible to shutdown a computer according to the principles of the present invention using the micom 20 only, without the use of the central processing unit 30, without departing from the true scope of the present invention. Thus, in other embodiments of the present invention, the central processing unit 30 could be eliminated, or the micom 20 could be eliminated, without departing from the true scope of the present invention.

The liquid crystal display 70 depicted in FIG. 3 is one type of computer display. In other embodiments of the present invention, the liquid crystal display 70 could be replaced by another type of computer display without departing from the true scope of the present invention. For example, the liquid crystal display 70 could be replaced by a cathode ray tube, a field emission display, electro-luminescent panels, a gas-plasma screen, or light-emitting diode panels.

The display power supply switch 60 in FIG. 3 utilizes three field effect transistors. However, it would be possible to shutdown a computer according to the principles of the present invention using other configurations without departing from the true scope of the present invention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:
   a power switch being switchable between a first state transmitting power and a second state interrupting transmission of power;
   a display conveying varying visual images according to data and control signals;
   a display controller controlling said display and outputting the data and control signals to said display; and a control unit outputting a first signal to said display controller interrupting transmission of power to said display when said power switch corresponds to said second state, said display controller outputting a second signal to said control unit when interruption of transmission of power to said display is complete, said control unit outputting a third signal interrupting transmission of power to said computer system in response to said second signal.

2. The computer system of claim 1, further comprising a power supply connected to said control unit, supplying power to said display and said computer system.

3. The computer system of claim 2, further comprising a display switch connected to said control unit and disposed between said power supply and said display, cutting off power to said display when said power switch corresponds to said second state.

4. The computer system of claim 3, said display controller outputting a cutoff signal to said display switch in response to said first signal, said display switch interrupting transmission of power to said display in response to said cutoff signal.

5. The computer system of claim 4, wherein said control unit selected from the group consisting of a central processing unit and a microcomputer.

6. The computer system of claim 3, said display switch cutting off power to said display by first cutting off a background voltage, next cutting off a data voltage, and then cutting off a source voltage to said display.

7. A control apparatus for controlling a supply of power and signals to a video display, comprising:

a video display conveying varying visual information to a user;

a primary unit processing data including the visual information, connected to and controlling said video display;

a power supply connected to said video display and said primary unit, transmitting electrical power to said video display and said primary unit;

a first power switch connected to said power supply, switching between a first state transmitting electrical power to said video display and said primary unit, and a second state interrupting transmission of electrical power to said video display and said primary unit;

a microcomputer connected to said first power switch and said power supply, determining state of said first power switch, outputting a first signal initiating the interrupting of transmission of electrical power to said video display and said primary unit in response to said first power switch switching to the second state, receiving a fifth signal, and outputting a sixth signal to said power supply interrupting transmission of electrical power to said primary unit in response to the fifth signal;

a central processing unit connected to said microcomputer, receiving the first signal from said microcomputer, outputting a second signal initiating the interrupting of transmission of electrical power to said video display in response to the first signal, receiving a fourth signal, and outputting the fifth signal to said microcomputer indicating a complete interruption of transmission of electrical power to said video display, the fifth signal being outputted in response to the fourth signal;

a video graphics array controller connected to said central processing unit and said video display, controlling said video display, outputting data to said video display, receiving the second signal from said central processing unit, outputting a third signal interrupting transmission of electrical power to said video display in response to the second signal, and then outputting the fourth signal to said central processing unit after outputting the third signal, the fourth signal indicating a complete interruption of transmission of electrical power to said video display; and a second power switch connected to said video graphics array controller, said video display, and said power supply, transmitting electrical power from said power supply to said video display, receiving the third signal from said video graphics array controller, and interrupting transmission of electrical power to said video display in response to the third signal.

8. The control apparatus of claim 7, wherein the third signal comprises a primary signal transmitted first, interrupting transmission of a primary electrical power to said video display, a secondary signal transmitted second, interrupting transmission of a secondary electrical power to said video display, and a tertiary signal transmitted third, interrupting transmission of a tertiary electrical power to said video display.

9. The control apparatus of claim 7, wherein the third signal comprises a primary signal, transmitted first, interrupting transmission of a primary electrical power to said video display, a first delay of about one hundred milliseconds following the transmission of the primary signal and preceding a transmission of a secondary signal, the secondary signal transmitted second interrupting transmission of a secondary electrical power to said video display, a second delay of about thirty-two milliseconds following the secondary signal and preceding a transmission of a tertiary signal, and the tertiary signal transmitted last interrupting transmission of a tertiary electrical power to said video display.

10. The control apparatus of claim 9, wherein the primary power corresponds to a backlight voltage, the secondary power corresponds to a data voltage, and the tertiary power corresponds to a source voltage.

11. The control apparatus of claim 7, wherein said video display comprises one of a liquid crystal display, a cathode ray tube, a field emission display, a plurality of electroluminescent panels, a gas-plasma screen, and a plurality of light-emitting diode panels.

12. The control apparatus of claim 7, wherein said power supply comprises a switching mode power supply.

13. The control apparatus of claim 7, further comprising a system bus connected to said central processing unit, said microcomputer, and said video graphics array controller.

14. The control apparatus of claim 13, further comprising a read-only memory storing a sequence of computer instructions for interrupting transmission of electrical power to said video display, and a random access memory, said read-only memory and said random access memory being connected to said system bus.

15. The control apparatus of claim 14, wherein said central processing unit outputs the second signal in accordance with the sequence of computer instructions for interrupting transmission of electrical power to said video display.

16. A method for controlling a supply of power and signals to a video display, comprising the sequential steps of:

determining a state of a power switch, said power switch being switchable between a first state transmitting electrical power to a video display conveying varying visual information to a user and to a primary unit processing data including the visual information, and a second state interrupting transmission of electrical power to said primary unit and said video display;

when state of said power switch corresponds to said second state, outputting a first signal from a microcomputer to said video display interrupting transmission of electrical power to said video display;

when blocking power to said video display, outputting a second signal from a video graphics array controller to said microcomputer indicating a complete interruption of transmission of electrical power to said video display; and outputting a third signal from said microcomputer in response to the second signal, for interrupting transmission of electrical power to said primary unit.

17. The method of claim 16, further comprised of a switching mode power supply connected to said power switch and said microcomputer, and a display switch separately located from said power switch and connected to said video graphics array controller and said video display.

18. The method of claim 17, wherein said video display comprises one of a liquid crystal display, a cathode ray tube, a field emission display, a plurality of electro-luminescent panels, a gas-plasma screen, and a plurality of light-emitting diode panels.

19. The method of claim 16, wherein said primary unit comprises a central processing unit, a memory, a power supply, and a system bus, said system bus being connected to said central processing unit, said memory, said video graphics array controller, and said microcomputer.

20. The method of claim 19, wherein the first signal is transmitted from said microcomputer through said central processing unit to said video display.

* * * * *